June 25, 1940.

M. G. CROSBY 2,205,847

CRYSTAL FILTER

Filed Feb. 24, 1938

2 Sheets-Sheet 1

INVENTOR.
MURRAY G. CROSBY
BY
ATTORNEY.

Patented June 25, 1940

2,205,847

UNITED STATES PATENT OFFICE 2,205,847

CRYSTAL FILTER

Murray G. Crosby, Riverhead, N. Y., assignor to Radio Corporation of America, a corporation of Delaware Application February 24, 1938, Serial No. 192,196

5 Claims. (Cl. 178—44)

This application concerns a crystal filter of the type which may be over-neutralized, neutralized or under-neutralized. An object of this invention is to provide means whereby the neutralization of the crystal may be varied by electronic means through the limits specified above. In my novel method and means the neutralizing energy is combined with the energy from the crystal through a coupling tube or tubes and the gain of coupling tubes is varied in order to vary the degree of neutralization. Thus, the crystal filter of the present invention is useful throughout the radio art. For example, it may be used as a symmetrical filter or to convert phase modulations into amplitude modulations with carrier exaltation as in my United States Patent #2,085,008 dated June 20, 1937, or as in my United States application #165,056 filed September 22, 1937, now Patent No. 2,156,374, issued May 2, 1939, or for amplitude modulated wave discrimination with carrier exaltation with side band frequency rejection, as in the latter United States application.

In the prior art of crystal filters there has been only one means of varying the degree of neutralization obtained, namely, by the variation of the variable neutralizing condenser. This was necessarily so in the case of the neutralized filters before my disclosure of the possibility of neutralizing through coupling tubes in my United States Patent #2,085,008 dated June 20, 1937. In this new type of circuit, the energy to be neutralized and the neutralizing energy are fed through coupling tubes before they are combined. This affords a control of the relative amplitudes of the two energies which is completely electronic and has a greater flexibility and range of variation than the filters of the prior art.

Figure 1:
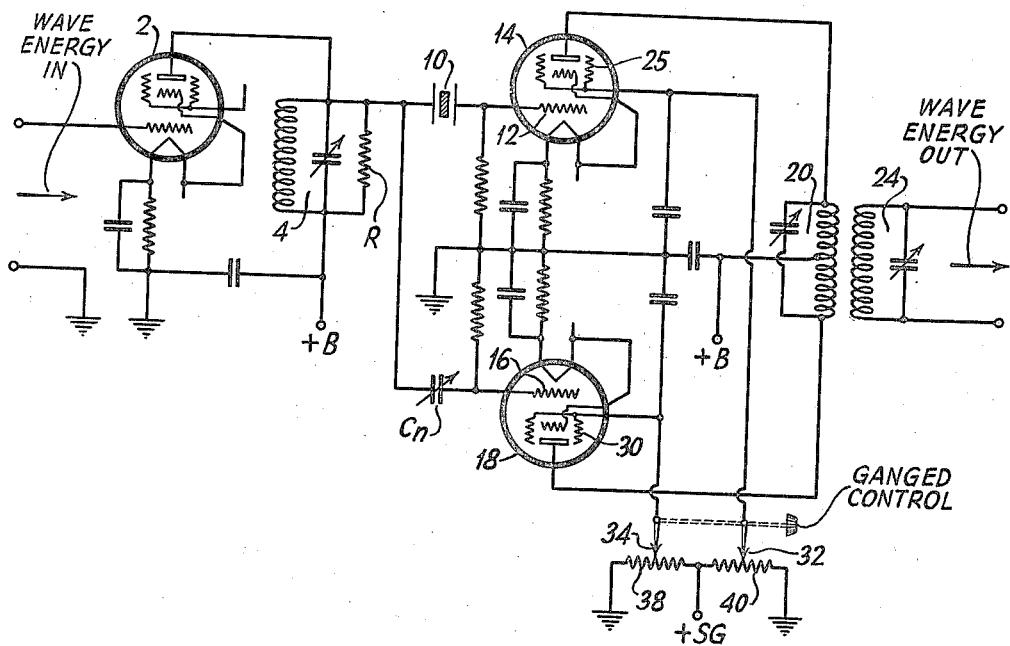
Figure 2:
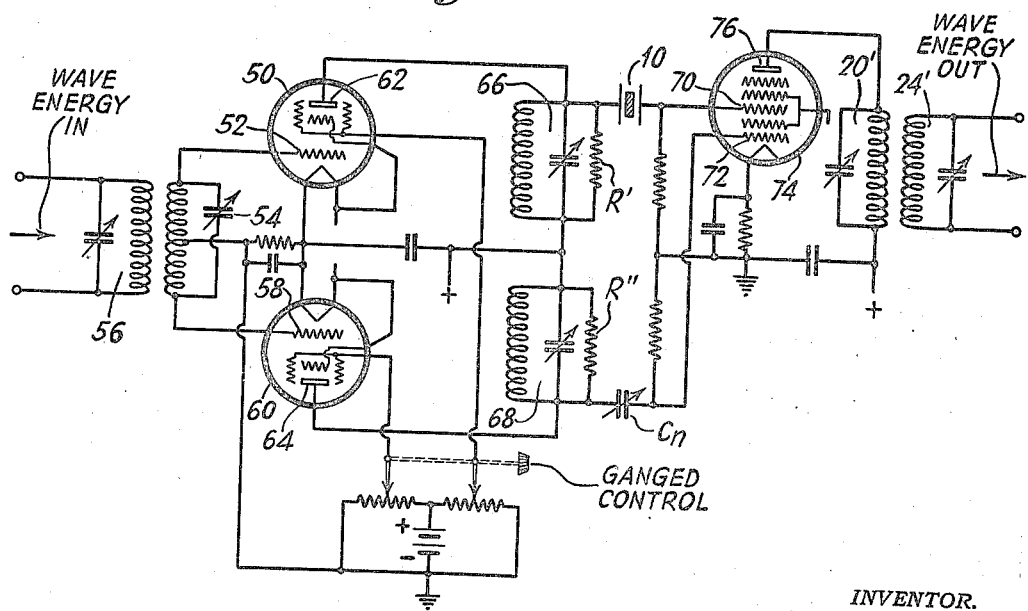

In describing the novel method and means of the present invention, reference will be made to the attached drawings wherein Figures 1 and 2 are circuit diagrams of filter circuits, the state of neutralization of which is controlled in accordance with my novel concept, while Figures 3 to 7 are band-pass characteristic curves illustrating the range of adjustment or control of the filter neutralization.

The circuit of Figure 1 shows one means by which the principle of this invention may be carried out. It is seen that the energy from the crystal 10 is fed to the grid 12 of one coupling tube 14 and the neutralizing energy from the neutralizing condenser, $C_n$, is fed to the grid 16 of another coupling tube 18. The plate circuits of these two coupling tubes 14 and 18 are connected in push-pull by circuit 20 so that the neutralizing energy supplied by 18 will properly buck the energy reaching 20 through the capacity of the crystal holder. The wave energy is supplied to 10 and $C_n$ from any source in any manner. For example, 10 and $C_n$ may derive the wave energy to be filtered from a tuned circuit 4 shunted by, if desired, a damping resistance R. Moreover, 4 may be in the plate circuit of a coupling and amplifying tube 2, the control grid and cathode of which are excited by the wave energy. The filtered wave energy may be supplied from 20 to any utilization circuit by way of circuit 24. It will be apparent that the circuit of Figure 6 of my United States Patent #2,085,008 dated June 20, 1937 (which utilizes a push-pull input transformer and an output wherein the two coupling tube plates are in parallel) could also be controlled in the same manner as this circuit of Figure 1. That is, the gain control means for the coupling tubes to be described hereinafter may be applied to said circuit of Figure 6 of said patent and the application thereto of this gain control is obvious.

Figure 3:
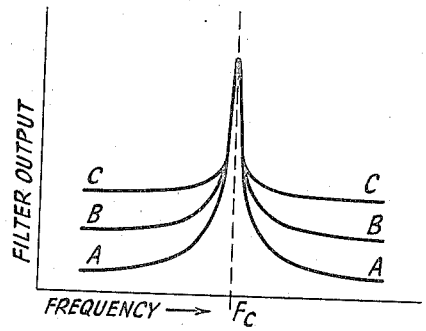
Figure 4:
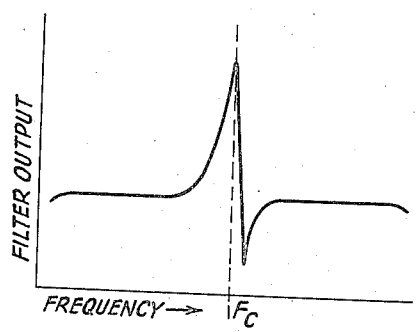
Figure 6:
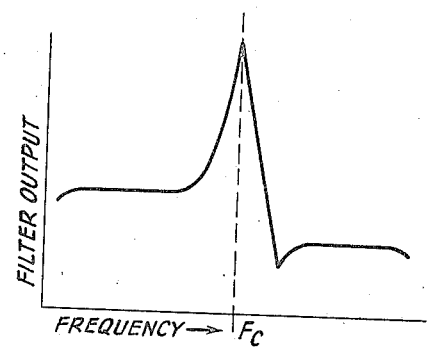
Figure 5:
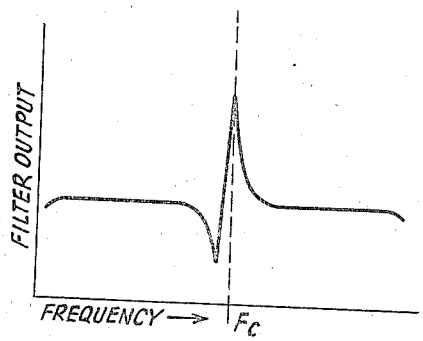
Figure 7:
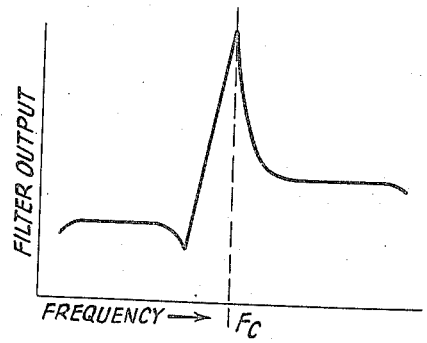

The relative amplification of the two coupling tubes 14 and 18 of Figure 1 is varied by varying voltages on the screen electrodes 25 and 30 of the two tubes by adjusting the taps 32 and 34 along resistors 38 and 40. However, it is immaterial as to which element voltage is varied just so the relative amplification of the two tubes is varied. As is shown in Figure 1, the potentiometers 32, 34, 38 and 40, which control the screen voltages, are ganged so that the screen voltage of one tube is varied up at the same time that that of the other is varied down. This would give a uni-control device which would have the following possible adjustments: (1) A completely neutralized symmetrical crystal filter circuit which would be obtained by setting for equal gain in the two tubes and adjusting the neutralizing condenser for complete neutralization. The characteristic of such a filter is shown in Figure 3, curve A. I have also found that curves such as those of B and C of Figure 3 may be obtained by adjusting for unequal gain and setting the neutralizing condenser to obtain a symmetrical characteristic. (2) Unneutralized unsymmetrical crystal filter. This could be obtained by adjusting for zero gain on the tube amplifying the neutralizing energy. It could also be obtained by adjusting for equal gain and varying the neutralizing condenser, $C_n$, to the off-neutralized positions. If the adjustment is such as to provide a high degree of off-neutralization, characteristic curves such as shown in Figures 4 and 5 may be obtained. Filters having these characteristics are used in my United States application #165,056 filed September 22, 1937, now Patent No. 2,156,374, issued May 2, 1939. With less off-neutralization, characteristics as illustrated in Figures 6 and 7 may be had. Here carrier exaltation and side band rejection and reduction, as in my United States application #186,273 filed January 22, 1938, is obtained. (3) By adjusting for zero gain on the tube amplifying the energy from the crystal, the effect would be the same as that of switching out the crystal filter to obtain unfiltered energy. (4) Combinations of (1), (2) and (3) which would produce a circuit allowing a variable degree of carrier exaltation for amplitude or phase modulation reception, or would produce an improved type of filter for converting phase modulation into amplitude modulation for detection in accordance with the principles of Patent #2,058,008 dated June 20, 1937.

The circuit of Figure 2 shows another embodiment of the principle of this invention. In this arrangement, the amplitude of the energy to be neutralized and the neutralizing energy is controlled by varying the gain of the tubes feeding the two circuits. Coupling tube 50 has its control grid 52 coupled by a tuned circuit 54 to circuit 56 excited by the wave energy to be translated. The control grid 58 of coupling tube 60 is also coupled to 54. The anode 62 of tube 50 is coupled to the input terminal of the crystal, while the anode 64 of tube 60 is coupled to a terminal of $C_n$. The anode circuits of 50 and 60 include tuned reactances 66 and 68 respectively, damped, if desired, by damping resistances R' and R''. The crystal 10 passes energy supplied by tube 50 while neutralizing condenser $C_n$ passes energy supplied by tube 60. The two energies are then combined by feeding that passed by crystal 10 to the grid 70 and that passed by $C_n$ to the grid 72 of a multi-grid tube 74. The anode 76 of tube 74 supplies energy to 20' and from 20' to 24'. It will be apparent that the variable gain tubes could be fed in phase and the combination of the two energies could take place in the push-pull output circuit of output coupling tubes also.

Although I have shown only the variation of the gain of coupling tubes to vary the degree of neutralization, it will also be apparent that the isolation afforded by the coupling tubes would also allow the variation of the neutralization by the variation of potentiometers or variable couplings. That is, the two separated energies may be relatively varied by inserting in their branches variable amplitude elements such as potentiometers, attenuators, variable couplings, etc.

I claim:

1. In a filtering system, an input reactance on which wave energy to be filtered is impressed, an output reactance from which filtered wave energy is derived, a first path including a piezo-electric crystal and a variable impedance coupling said reactances, a second path including a variable impedance coupling said reactances, and means for differentially varying said impedances to vary the relative amplitudes of the wave energies passed thereby.

2. In a wave filtering system, an input reactance excited by said wave energy to be filtered, a pair of electron discharge devices each having input and output electrodes, an output reactance, a piezo-electric crystal in a holder having input and output electrodes, means coupling the input electrodes of one of said electron discharge devices to said input reactance, means coupling the output electrodes of said one of said electron discharge devices to said output reactance, one of said coupling means including said crystal holder in series, circuit means coupling the input electrodes of said other electron discharge device to said input reactance, circuit means coupling the output electrodes of said other electron discharge device to said output reactance, a variable reactance in series in one of said last two circuit coupling means, means for applying a direct current biassing potential to an electrode in each of said devices, and means for varying the applied potentials differentially.

3. A system as recited in claim 2 wherein said electron discharge devices each include an auxiliary screen-like electrode and wherein said direct current biassing potentials are applied to said screen-like electrodes.

4. In a filtering system, an output circuit, an input circuit, means for impressing wave energy to be filtered on said input circuit, an electron discharge device having an output electrode coupled with said output circuit said device having a plurality of input electrodes, a piezo-electric crystal in a holder having input and output electrodes, means connecting the output electrode of said holder to one of the input electrodes of said device, a circuit including variable gain control means coupling the input electrode of said crystal holder to said input circuit, a circuit including a variable reactance and variable gain control means coupling another input electrode of said device to said input circuit, and means actuating said variable gain control means differentially.

5. In a filtering system, an input circuit, an output circuit, means for impressing wave energy to be filtered on said input circuit, a piezo-electric crystal holder having an input electrode and having an output electrode, a pair of electron discharge devices each having input and output electrodes and an auxiliary electrode, means coupling said crystal holder in a series circuit between said input circuit and the input electrodes of one of said devices, circuit means coupling the output electrodes of said one of said devices to said output circuit, a variable reactance connecting the input electrode of the other of said devices to said input circuit, means coupling the output electrode of said other of said devices to said output circuit, means for applying variable biassing potentials to said auxiliary electrodes, and means for varying the potentials applied to said auxiliary electrodes differentially.

MURRAY G. CROSBY.